United States Patent [19]

Brünsch et al.

[11] 4,097,193
[45] Jun. 27, 1978

[54] ELASTOMERIC DAMPING ARRANGEMENT

[75] Inventors: Klaus Brünsch, Weidach; Emil Weiland, Hohenbrunn, both of Germany

[73] Assignee: Messerschmitt-Boelkow-Blohm GmbH, Munich, Germany

[21] Appl. No.: 751,698

[22] Filed: Dec. 17, 1976

[30] Foreign Application Priority Data

Dec. 24, 1975 Germany .............. 2558709

[51] Int. Cl.² .......................... B64C 11/20
[52] U.S. Cl. .............. 416/224; 416/241 A; 416/500
[58] Field of Search .......... 416/241 A, 224, 500, 416/229 A, 229 R; 244/123

[56] References Cited

U.S. PATENT DOCUMENTS

| 1,842,178 | 1/1932  | Kempton  | 416/224 |
| 2,426,123 | 8/1947  | Sikorsky | 244/123 |
| 2,431,184 | 11/1947 | Martin   | 416/500 |
| 3,357,850 | 12/1967 | Baker    | 416/241 |
| 3,796,513 | 3/1974  | Jonas    | 416/224 |
| 4,006,999 | 2/1977  | Brantley | 416/224 |

FOREIGN PATENT DOCUMENTS

| 545,510 | 8/1957 | Canada         | 416/500 |
| 452,841 | 8/1936 | United Kingdom | 416/224 |

Primary Examiner—Everette A. Powell, Jr.
Attorney, Agent, or Firm—W. G. Fasse; W. W. Roberts

[57] ABSTRACT

An elastomeric damping arrangement is constructed to provide a highly efficient damping of the vibrations of a vibration prone member, such as an airfoil, especially a helicopter rotor blade. The damping arrangement is applied directly on or to the vibration prone structural member in the region of dynamic deformation, as an integral component part of the structural member. At least one damping layer is covered by a protecting layer which merges smoothly into the surface of the vibration prone member. The damping layer is made of a viscoelastic material having a high internal damping action. The protecting or cover layer is made of high strength material having a high rigidity in the direction of the occurring damping force.

13 Claims, 5 Drawing Figures

ELASTOMERIC DAMPING ARRANGEMENT

BACKGROUND OF THE INVENTION

The invention relates to an elastomeric damping arrangement for damping vibrations of a structural member, such as a vibration prone airfoil, particularly a helicopter rotor blade tending to vibrate under dynamic deformations. Such arrangements may include at least two superposed layers, such as a cover layer and a damping layer with interconnected surface areas. The cover layer would be highly rigid in the direction of the damping force to be applied. The damping layer is subjected to a shearing load when the structural member vibrates. The damping layer may be made of a viscoelastic material having a high internal damping.

A previously known elastomeric damper for pivotally or hingedly connected helicopter rotor blades comprises superposed metal plates. Viscoelastic damping layers are glued between the metal plates. The metal plates are alternately anchored on the rotor cap or head and on the blade mounting by means of pivot points. However, this known damper has the disadvantage that two specific or defined anchoring points are necessary where the vibration prone structural member is subjected to the damping force. As a result, high wear and tear occurs at these anchoring points. Besides, this arrangement impairs the outer appearance of the structural member. The damper of the prior art is also difficult to install where space is at a premium.

OBJECTS OF THE INVENTION

In view of the foregoing, it is the aim of the invention to achieve the following objects, singly or in combination:

to provide an elastomeric damping arrangement for a vibration prone structural member of any geometry, whereby to effectively damp vibrations of the structural member when it is subjected to dynamic deformations;

to effectively damp a vibrating structural member without impairing the outer appearance of the vibration prone structural member;

to avoid specific, heavily loaded anchoring points for the damping means and the resulting high wear and tear at these points;

to provide a damping arrangement that is easily adapted to structural members with complicated profiles;

to provide a damping arrangement which is integrally connected with a vibration prone airfoil so as not to distort the profile of the airfoil; and to provide a damping arrangement in a reliable, spacesaving form, especially suitable for helicopter rotor blades undergoing torsional and/or bending vibration deformations.

SUMMARY OF THE INVENTION

According to the invention, an elastomeric damping arrangement is provided for vibration prone structural members, such as an airfoil, or the like especially for helicopter rotor blades. Such members tend to vibrate under dynamic loads or vibrations. At least one protective cover layer and at least one damping layer are superposed and directly connected to or on the vibration prone structural member in the region of the dynamic deformations. The outer or uppermost cover layer is shaped to fit or correspond to the contour of the structural member, whereby the uppermost protective cover layer blends substantially smoothly into the outer contour of the vibration prone structural member without any ridge or the like. The cover layer is made of a material having a high rigidity in the direction of the damping force. The cover layer material is preferably a composite fibrous synthetic material that is readily adapted to structural members having complicated profiles. A fibrous synthetic material provides a high degree of stability. The damping layer which is subject to shearing forces caused by the vibrations of the structural member, is made of a viscoelastic material. Silicones and various rubber compounds or polyurethane may be used as damping materials. These materials exhibit a high dynamic and thermal stability, high elasticity, and constant physical properties over large temperature ranges. Especially polyurethane has advantageous bonding and processing capabilities, and is preferably used due to these capabilities.

The damping arrangement of the invention is an integral component part of the vibration prone structural member and forms a multi-layered covering. This covering projects, if at all, insignificantly over the outer surface of the structural member. Since the damping arrangement is connected directly to the vibration prone structural member in the region of dynamic deformation, the same effective loads are applied to the damping arrangement and to the structural member when the latter vibrates. Thus, the loads effective between the damping arrangement and the structural member mutually cancel each other. This has the advantage that no individual high stress anchoring points are required for the transfer of external forces.

BRIEF FIGURE DESCRIPTION:

In order that the invention may be clearly understood, it will now be described, by way of example, with reference to the accompanying drawings, wherein.

DETAILED DESCRIPTION OF PREFERRED EXAMPLE EMBODIMENTS

Figure 1:
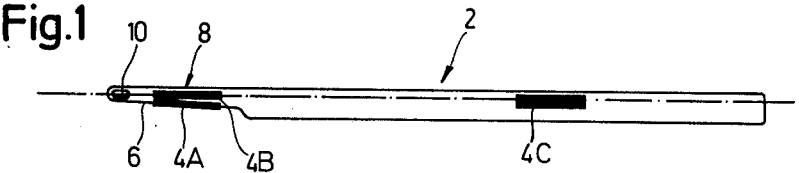
FIG. 1 shows a schematic top view of a hingeless helicopter rotor blade with several elastomeric damping arrangements integrally connected with the blade.

According to FIG. 1, the elastomeric damping arrangements 4A, 4B, and 4C of the invention are integrally connected to a helicopter rotor blade 2. The damping arrangements are applied in the regions which are strongly but reversibly, deformed by the natural vibrations of the rotor blade 2. The damping arrangement 4A is positioned on the rear edge 6 of the rotor blade 2 in the region of the blade shank or root 8 near a blade mounting 10 for a blade connecting bolt. The damping arrangement 4B is arranged on the pressure side and on the suction side of the rotor blade 2 near the shank or blade root. The damping arrangement 4C is arranged both on the suction and on the pressure side in a region spaced from the mounting end of the blade a distance corresponding to 0.7 times the length of the blade.

As shown in FIGS. 2 to 5, the damping arrangement 4 forms flat multi-layered cover means in a recess 14 extending in the longitudinal direction of the rotor blade 2. The recess 14 is located in the surface of the rotor blade 2 which is made of a fiber glass reinforced synthetic material. The damping arrangement 4 has an outer contour which conforms to the profile of the rotor blade 2. Because of the recess 14, the profile of the rotor blade 2 is not distorted at all by the damping arrangement 4.

For subsequent installations of the damping arrangement 4, it is possible to dispense with the formation of the recess 14. In that instance the damping arrangement 4 is applied as a coating or cover directly to the outer surface of the rotor blade 2, whereby the edges of the damping arrangement blend smoothly into the surface contour of the blade.

Figure 2:
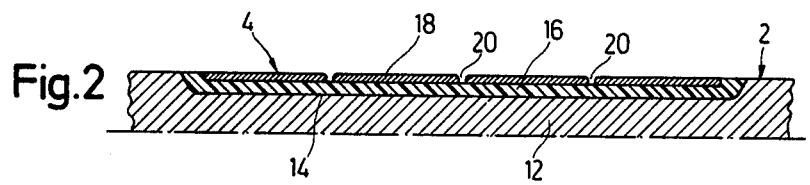
FIG. 2 is a longitudinal section along the length of a rotor blade illustrating a first damping arrangement embodiment of the invention with grooves in the cover layer.

According to the invention, as shown in FIG. 2, the damping arrangement 4 includes a damping layer 16 having an inner side and an outer side. The inner side of the damping layer 16 is laminally bonded to the bottom of recess 14 by means of an adhesive such as epoxy based FM 123 of Bloomingdale. The damping layer 16 is made of a viscoelastic material such as polyurethane. Various silicones may also be used as damping material. A cover layer 18 is laminally bonded to the outer side of the damping layer 16 by an adhesive of the above type. This laminal bonding provides an intimate bond over the entire surface area of the bonded elements, whereby shearing forces are transmitted efficiently. The cover layer 18 is made of a high-strength material having a high rigidity in the longitudinal direction of the blade. The high-strength material is of a fibrous, preferably a synthetic carbon-fiber material, which is preferred because of its strength and easy adaptability to complicated structural shapes.

Due to the surface area bond the vibrations of the rotor blade 2 deform the viscoelastic damping layer 16 in a shearing manner. The damping layer 16 provides a strong vibration damping because of its high internal friction.

The cover layer 18 could cause an undesired stiffening of the rotor blade 2 in damping arrangements having a long axial length. To avoid such possible stiffening of the rotor blade 2, according to a preferred example embodiment of the invention shown in FIG. 2, the cover layer 18 is penetrated by the grooves 20. The grooves 20 run perpendicularly to the plane of the vibrations of the rotor blade 2.

Figure 3:
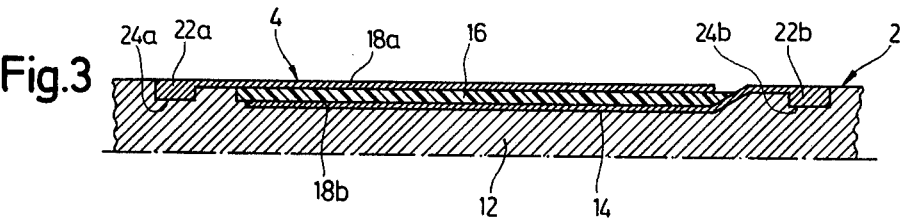
FIG. 3 is a sectional view along the length of a rotor blade showing another embodiment wherein the opposite ends of the cover layer are secured to the structural member in a non-slidable manner.

According to the invention, the damping arrangement 4 of FIG. 3 comprises a viscoelastic damping layer 16 sandwiched between an upper or outer cover layer 18a and a lower, or inner, layer 18b. An adhesive surface bonding is provided between these layers 16, 18a, and 18b. The upper cover layer 18a matches, or merges into, the outer profile of the rotor blade 2. The lower cover layer 18b rests movably on the bottom of the recess 14. Edge reinforcements 22a and 22b are formed at the opposite ends of the cover layers 18a and 18b, respectively. The reinforcements 22a and 22b are inserted in a form-locking manner in depressions 24a and 24b, respectively.

Figure 4:
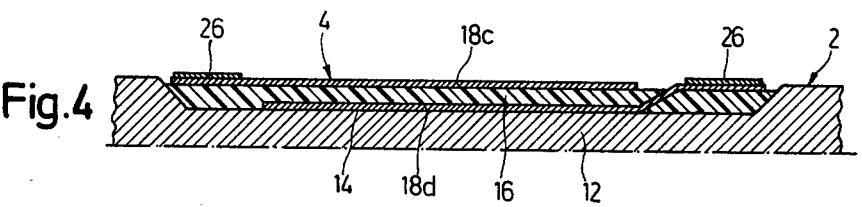
FIG. 4 is a sectional view along the length of a rotor blade illustrating a further embodiment, wherein the inner and outer cover layers are secured by friction resistance straps.

The depressions 24a and 24b are located in the fiber glass reinforced synthetic material 12 of the rotor blade 2. The cover layers 18a and 18b shift relative to each other in the longitudinal direction of the rotor blade 2 due to the natural vibrations of the rotor blade 2 in the plane of FIG. 3. Because of such shifting of the cover layers 18a and 18b, the viscoelastic intermediate damping layer 16 is deformed by shearing. Due to the damping properties of the viscoelastic material, the damping layer 16 provides a rapid attenuation of the vibration of the rotor blade 2. FIG. 4 shows another embodiment according to the invention, wherein the damping arrangement 4 employs strap-like elements 26 to fasten an upper cover layer 18c and a lower cover layer 18d to the rotor blade 2 through friction resistance or in a friction locking manner. The strap-like elements 26 are located at the opposite ends of the cover layers 18c and 18d. Other aspects of the mode of operation and structure of the damping arrangement of FIG. 4 are the same as described above with reference to FIG. 3. Corresponding parts in FIG. 4 are labeled with the same reference numbers used in FIG. 3.

Figure 5:
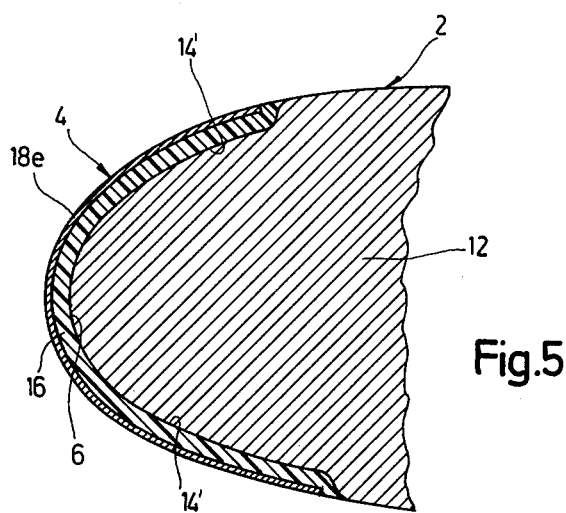
FIG. 5 is a section through the back edge of the rotor blade normal to the longitudinal axis of the blade and showing an elastomeric damping arrangement in the region of the blade root.

In the example embodiment of FIG. 5, the damping arrangement 4 is located on the rear edge 6 of the rotor blade 2. Said damping arrangement 4 and the fiber glass reinforced synthetic material 12 of the rotor blade 2 form an integral, interconnected covering or coating. The covering is arranged in a receiving chamber in the shape of a depression 14' in the synthetic material 12. The outer contour of the coating conforms to the profile of the rotor blade 2. The damper 4 includes a high-strength cover layer 18e laminally bonded to the outer side of the viscoelastic damping layer 16. The other, or inner side, of the damping layer 16 is laminally bonded to the rotor blade 2 in the region of the depression 14'. The above mentioned adhesive is cased for the bonding. The natural vibration of the rotor blade 2 in the direction of the control plane of the rotor blade is damped by the damping arrangement of FIG. 5.

The single damping layer shown and described above may be replaced by multi-layered sandwiched damping arrangements for use where high dynamic loadings arise, by using more than one damping layer. All the layers of such a multi-layer damper would be adhesively bonded to each other and the ends of the cover layers are secured to the blade.

In view of the above detailed description, it will be appreciated that the damper according to the invention is especially suitable as a reliable and space saving vibration damping device for the natural vibrations of structural members which are deformable in an elastic, reversible manner, whereby the damper does not interfere with the external shape or configuration of the structural member. The present damper is especially advantageous for use in hingeless helicopter rotor blades in which the cover and damping layers are arranged in the area of the rear, or trailing, edge of the blade, and/or on the blade pressure and blade suction side of the blade root, as well as in the area located at about 0.7 times the length of the blade, namely closer toward the outer end as shown at 4C in FIG. 1, for damping of blade torsional vibrations and/or blade bending vibrations in the just enumerated areas. It has been found that the cover layer, such as 16, and/or 14, is preferably made of a composite fiber material, preferably of carbon fiber material which can be adapted without difficulties to any structural members of complicated shape while simultaneously assuring a high structural strength and rigidity.

In order to achieve a very flat structure, it is suitable to secure the damping layer directly to the surface of the structural member. This may, for example, be accomplished by means of a surface adhesive bond without an intermediate cover or protecting layer between the surface of the structural member and the damping layer. The damping layer would be protected with an outwardly facing cover layer which smoothly merges or blends into the surface of the structural member. At least one end of the cover layer should be secured to the structural member in a manner resisting shearing forces in order to provide a shearing deformation as large as possible, for the damping layer to thereby achieve a high damping efficiency.

As described above with reference to FIG. 2, it is advantageous to provide the cover layer with grooves extending perpendicularly to the plane of the vibrations of the structural member, whereby it is avoided to stiffen the structural member which is otherwise capable of vibrating. Such stiffening is not desired, but would tend to occur, especially where the axial length of the cover and damping layers is substantial. The grooves 20 are an effective remedy in this context. Further, the most efficient merging of the damping arrangement into the outer surface configuration of the structural member and the integral connection between the damping arrangement and the structural member is accomplished by providing a chamber, or recess, in the surface of the structural member which is just deep enough to receive the damping and cover layers. Such chambers or recesses would be located in the areas where the structural member is subject to dynamic deformations. Where the damping arrangement must handle larger dynamic loads it is advantageous to alternate a plurality of sandwiched cover layers and damping layers, whereby it is practical to secure the opposite ends of adjacent cover layers in a shearing force resisting manner to the structural member.

Although the invention has been described with reference to specific example embodiments, it is to be understood, that it is intended to cover all modifications and equivalents within the scope of the appended claims.

What is claimed is:

1. An elastomeric damping arrangement providing a damping force for a structural member having a given surface contour and being capable of vibrating in response to dynamic deformations, especially for an airfoil, comprising damping layer means, cover layer means, and means operatively interconnecting said layer means to each other in a surface contact fashion, to form an integral structure arranged in intimate contact with the structural member solely in regions thereof subject to said dynamic deformations and to said vibrations, said integral structure merging smoothly into said surface contour of said structural member in said dynamic deformation regions, said cover layer means being made of a high strength material having a high unidirectional rigidity which is effective in the direction of said damping force, said damping layer means being made of a viscoelastic material.

2. The elastomeric damping arrangement of claim 1, wherein said cover layer means is made of a fiber composite material.

3. The elastomeric damping arrangement of claim 2, wherein said fiber composite material is a carbon fiber material.

4. The elastomeric damping arrangement of claim 1, further comprising adhesive bonding means which secure the damping layer means directly to the surface of said structural member.

5. The elastomeric damping arrangement according to claim 1, wherein said damping layer is made of polyurethane.

6. The elastomeric damping arrangement according to claim 1, further comprising means securing one end of said cover layer means to said structural member in a manner rigid against relative displacement.

7. The elastomeric damping arrangement according to claim 1, wherein said cover layer means comprise grooves extending perpendicularly to the plane in which the vibrations of the structural member occur.

8. The elastomeric damping arrangement according to claim 1, further comprising recess means in said structural member, said recess means being located in regions where said dynamic deformations occur in said structural member, said integral structure including said cover layer means and said damping layer means being located in said recess means.

9. The elastomeric damping arrangement according to claim 1, wherein said damping layer means and said cover layer means each comprise a plurality of layers, said arrangement further comprising means securing opposite ends of adjacent ones of said cover layer means to said structural member in a manner rigid against relative displacement.

10. The elastomeric damping arrangement according to claim 1, wherein said integral structures are secured to a hingeless helicopter blade in the area of the blade rear edge at the blade root or stem.

11. The elastomeric damping arrangement according to claim 1, wherein said integral structures are secured to the suction side of a blade.

12. The elastomeric damping arrangement according to claim 1, wherein said integral structures are secured to the pressure side of a blade.

13. The elastomeric damping arrangement according to claim 1, wherein said integral structures are secured in positions which are spaced a distance from the secured end of an airfoil corresponding to about 0.7 times the length of said airfoil.

* * * * *